July 5, 1966    R. SCHMIDT    3,258,988
STEERING COLUMN ASSEMBLY
Filed June 30, 1965    3 Sheets-Sheet 1
Fig. 1
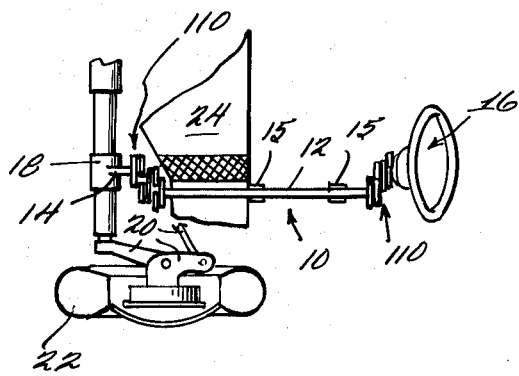
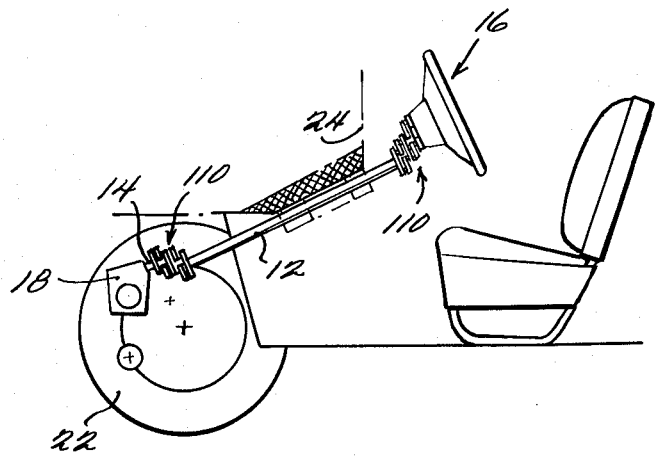
Fig. 2
INVENTOR
RICHARD SCHMIDT
BY Cushman, Darby & Cushman
ATTORNEYS July 5, 1966  R. SCHMIDT  3,258,988
STEERING COLUMN ASSEMBLY
Filed June 30, 1965  3 Sheets-Sheet 3
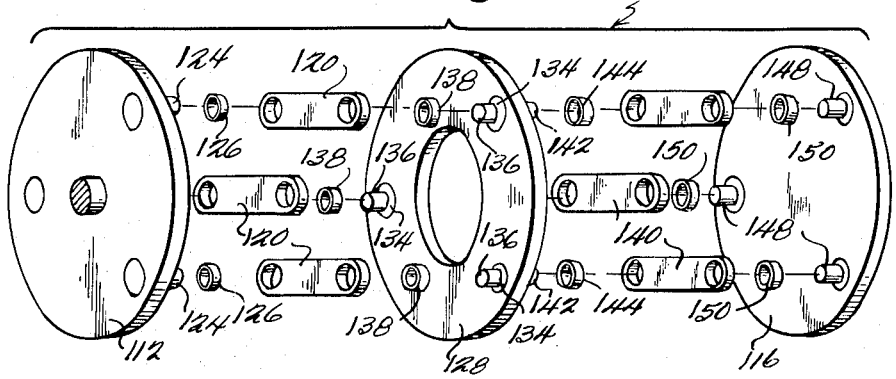
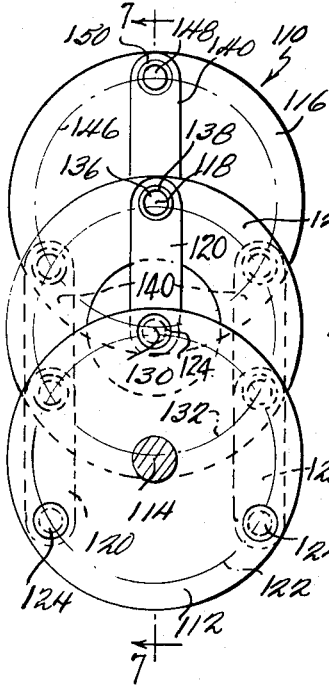
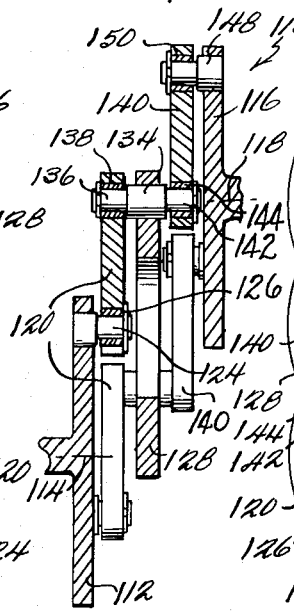
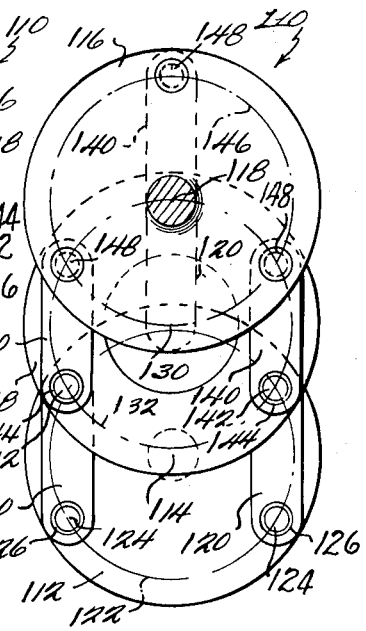
INVENTOR.
RICHARD SCHMIDT
BY
Cushman Darby & Cushman
ATTORNEYS

United States Patent Office 3,258,988
Patented July 5, 1966

3,258,988
STEERING COLUMN ASSEMBLY
Richard Schmidt, 231 High Road, Madison, Ala.
Filed June 30, 1965, Ser. No. 468,524
5 Claims. (Cl. 74—493)

This application constitutes a continuation-in-part of my co-pending application Serial No. 406,696, filed October 27, 1964.

The present invention relates to a steering column mechanism for automobiles, or other vehicles; and in particular, the invention provides for an improved steering mechanism having an articulated steering shaft with separate portions of the shaft coupled together but offset relative to one another. The shaft portions are coupled by an improved torque transmitting mechanism which permits smooth and reliable rotary movements of the shaft portions, while at the same time, permitting relative adjustment of the offset relationship of the shafts.

A conventional steering column includes a main steering shaft which is usually interconnected between a steering wheel and steering linkage members for effecting turning and other steering movements of the wheels of a vehicle. Although various devices have been proposed for permitting an adjustment of the steering wheel position within the vehicle relative to the position of the driver of the vehicle, such mechanisms have been incorporated in essentially a single main steering shaft running between the steering wheel and the linkage members which translate the rotary motion of the wheel to turning movements of the vehicle. The single turning shaft type of steering column has a number of disadvantages, and probably its most serious disadvantage resides in the unsafe condition presented by a single shaft running from the front portion of a vehicle into the driver compartment of the same vehicle. Upon a severe impact of the vehicle, it is not unusual for the steering column to be moved rearwardly into the driver compartment carrying with it the steering wheel which is mounted on the inner end of the steering column. This reaction to the impact of the vehicle is necessarily dangerous and accounts for great numbers of injuries due to the pressing of the steering wheel or its central shaft against a driver occupant of a vehicle. Conversely, upon impact, the driver of the vehicle may be thrown forwardly against the steering wheel with the possibility of suffering severe injury from the steering wheel or the steering shaft. Additionally, the single shaft type of steering column creates certain problems of design in that the various members and structures located in the front of the vehicle must normally be designed to fit around the position of the steering column. In the case of rear engine automobiles having a fuel tank and a trunk in the front compartment of the vehicle, much space is lost for the fuel tank and the trunk space because of the usual position of the steering column.

The present invention provides for a steering column construction having one or more torque transmitting means interposed along the length of the column for the purpose of transmitting rotary forces between segments of a steering column. The column is made up of two or more steering shafts which are offset relative to each other, and the torque transmitting means is connected between the offset shafts so as to transmit rotary forces smoothly from one shaft to the other even though the two shafts are not in axial alignment. Such an articulated steering shaft structure permits the steering column to be positioned around a fuel tank or the trunk space in the front portion of a vehicle so that there is no interference with the reliable steering movements of the vehicle from the steering wheel located within the driver compartment. The offset shafts which make up the steering column of this invention are interconnected by the improved torque transmitting means described in my co-pending application Serial No. 406,696, filed October 27, 1964. This torque transmitting means permits a smooth coupling of offset shafts for transmitting rotary movement from one shaft to the other. At the same time, the torque transmitting means permits a relative adjustment of the offset relationship of the shafts which are interconnected by the torque transmitting device. Thus, the steering column of this invention provides for an adjustment of the position of the steering wheel within the driver compartment, and the steering wheel can be adjusted in any direction on a plane which is at right angles to the longitudinal axis of the steering column.

One of the most important features of this invention, in providing offset steering shafts in a steering column, is that the torque transmitting means can be designed to deform or fracture upon receiving a severe impact along the longitudinal axis of the steering column of the vehicle. Accordingly, when the vehicle strikes another object severely, the forces are transmitted toward the steering wheel through the lower steering shaft segments, but the deformable or frangible nature of the torque transmitting means which interconnects the steering shaft segments causes the steering column to bend or break at the point of articulation between the offset shafts. This characteristic causes the steering column to collapse, and the impact forces are not transmitted through the upper part of the steering column and into the driver compartment. Thus, there is provided a safer steering column construction than can be designed with a single or angular displaced steering shaft, and the particular construction of the torque transmitting means used with this invention permits the deforming or collapsing of the column upon impact without affecting the strength and reliability of the steering column for all steering and control movements.

Where design conditions require that the steering column be built around certain members within the front portion of the vehicle, it is contemplated that more than one torque transmitting means may be interposed between a series of offset steering shaft members. In this manner, the steering column can include a torque transmitting means at its upper end near the steering wheel for the purpose of allowing an adjustment of the steering wheel as described above, and the same steering column can include a second torque transmitting means near the lower end of the column for placing the intermediate portion of the steering column in a desired location and for providing the safety feature of deforming or collapsing near the lower end of the column upon receiving an impact from the front of the vehicle. Additionally, the upper torque transmitting means can be constructed to deform upon receiving an impact from the direction of the steering wheel. In this manner, the force of the driver against the steering wheel will be absorbed, and injury will be less severe when the vehicle is brought to an abrupt stop by an impact with another object.

These and other advantages of the present invention will become apparent in the more detailed discussion which follows; and in that discussion, reference will be made to the accompanying drawings in which:

FIGURE 1 is a top plan view showing the use of the torque transmitting means in a steering column construction;

FIGURE 2 is a side elevational view of the torque transmitting means installation as shown in FIGURE 1;

FIGURE 5 is an exploded perspective view of a torque transmitting means for use with the present invention;

FIGURE 6 is a front elevational view of the torque transmitting means;

FIGURE 7 is a vertical sectional view taken along line 7—7 of FIGURE 6; and

FIGURE 8 is a rear elevational view of the torque transmitting device.

Figure 3:
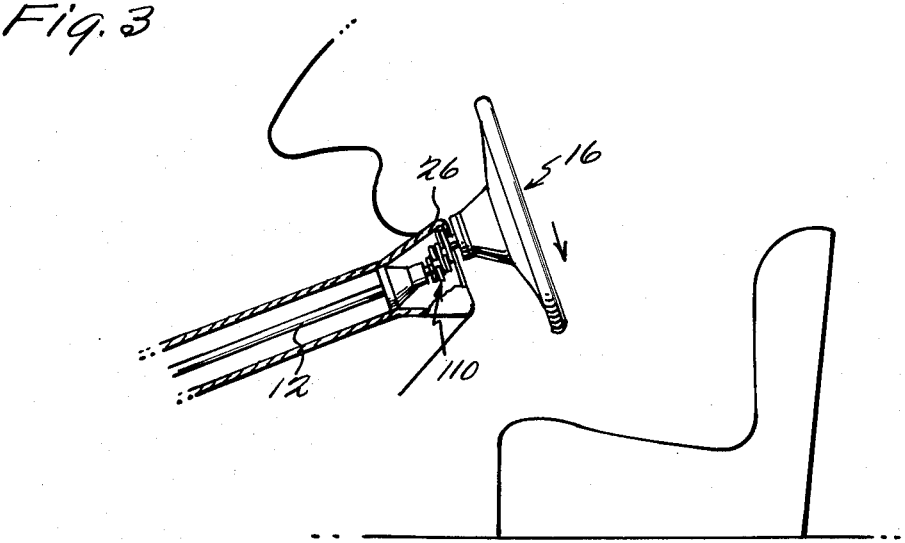
FIGURE 3 is a side elevational view of a steering wheel adjustably mounted to a steering column as shown in a high position of adjustment.

Referring to FIGURE 1, a steering column 10 is shown as mounted in a front part of an automobile for applying steering and control movements to front wheels of the automobile. The steering column 10 is made up of steering shaft members 12 and 14, and the longitudinal axes of the steering shaft members are offset relative to one another so as to position the central steering shaft 12 out of the way of a front compartment of the automobile. The front compartment of the automobile is the space in front of the driving compartment, and this front space may be an engine compartment, or, in the case of rear engine vehicles, a trunk and gasoline storage compartment. The steering shaft member 12 may be of any length required to fit the particular front compartment in which it is installed, and more than two steering shaft members may be used to fit the steering column 10 around specific barriers or components used in the automobile construction.

The segmented steering column construction of this invention is shown as including two torque transmitting devices 110 at separate positions along the steering column 10. A lower torque transmitting means 110 connects the two steering shaft members at the lower end of the column so as to transmit rotational forces from the steering shaft 12 to the steering shaft 14. The steering shaft member 12 may be mounted for rotation in a fixed axis by suitable bearing supports 15, and the lower steering shaft member 14 is preferably mounted to move relative to the position of the steering shaft 12. A second torque transmitting means 110 is coupled to the upper end of the steering shaft 12 so as to receive and transmit rotational forces applied to a steering wheel 16 by a driver of the vehicle. Thus, turning and control movements applied to the steering wheel 16 will be transmitted down the steering column 10 to the lower part of the column where the steering shaft member 14 is connected to a steering gear box 18. The steering gear box is of any conventional construction and includes the necessary members for translating the rotational movement of the steering column members into turning movements of the wheels of the vehicle. Other linking members 20 are shown as being interconnected to a front wheel 22 so as to apply steering movements to the vehicle as it moves along. The linking members 20 include conventional linkage associated with the front axle and suspension members of the vehicle for turning the front wheels of the vehicle.

A gas tank or front compartment space 24 is shown in FIGURES 1 and 2 in its relative position to the offset steering shaft 12. As can be seen, the steering shaft 12 is offset laterally and downwardly from the center longitudinal axis of the steering wheel 16 so as to provide additional space in the gas tank or storage compartment indicated by the shaded lines.

The torque transmitting means 110 which are interposed between the offset portions of the steering column 10 are preferably made from components which deform or break when sufficient force is applied in either direction along the longitudinal axis of the steering column. A preferred embodiment for the torque transmitting means 110 will be discussed in greater detail later; and in that discussion, reference will be made to certain link members within the torque transmitting means which can be constructed to deform upon a severe impact. Since portions of the steering column are offset relative to one another, any impact force originating from either end of the steering column would be interrupted in its travel down the column. As a result, there would be less likelihood of injuries to a driver of a vehicle due to any impact force applied to the steering wheel by the occupant himself or by the movement of the steering column toward the occupant. It is contemplated that when the vehicle is sharply impacted, the driver occupant will be propelled forwardly against the steering wheel 16; and this force of the driver will cause the steering wheel to collapse onto its upper torque transmitting means 110. Other forces coming from the front of the vehicle will be absorbed by the lower torque transmitting means 110, and the two couplers 110 will substantially reduce danger of extreme harm from the steering column elements. Additionally, the offset relationship of the steering shafts 12 and 14 prevent the direct transmission of impact forces up the column 10 and against the driver of the vehicle, as would be the case with a single steering shaft type of construction.

Figure 4:
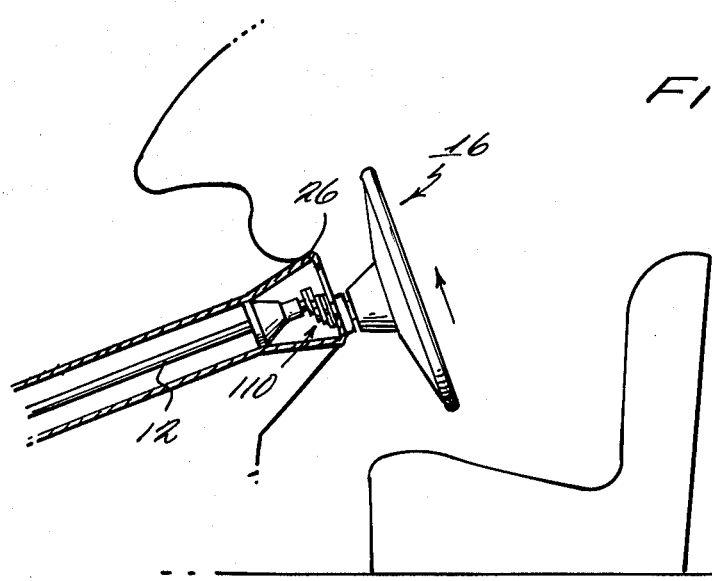
FIGURE 4 is a side elevational view of an adjustable steering wheel mounted on a steering column as shown in a low position of adjustment.

Referring to the FIGURES 3 and 4, the torque transmitting means 110 which is located on the upper end of the steering shaft 12 is shown with respect to an adjustment feature of the steering wheel. Because of the relationship of rotary members which make up the torque transmitting coupler 110, it is possible to move the steering wheel 16 in any direction in a plane which is at right angles to the longitudinal axis of the steering column. Of course, the steering wheel and the upper ends 26 of the steering column are provided with suitable tracking and guiding means for determining the range of movements available to the steering wheel. The steering wheel 16 may be connected directly to one of the rotary member components of the torque transmitting coupler 110, or a short shaft may be connected to the end of the torque transmitting coupler and then to the steering wheel. A suitable locking means (not shown) is provided for locking the steering wheel into any of its positions of adjustment so that the steering wheel may be set to a desired position and maintained in that position for all steering and control movements of the vehicle. The locking means and guide means associated therewith are not shown but may be of any conventional design.

Although the steering column construction of this invention has been described with reference to the use of two torque transmitting couplings 110 within the column, it is contemplated that a single torque transmitting device, or even more than two, may be used in a given steering column construction. Where a single torque transmitting device is used, the steering column would include essentially two steering shaft elements with the torque transmitting coupler positioned therebetween. The two steering shaft members would be offset relative to one another with their central longitudinal axes parallel to each other so that the same advantages in safety and efficient use of space could be accomplished with the steering column as was described for the above preferred embodiment.

Looking now to the detailed construction of preferred torque transmitting means for use with the steering column construction of this invention, reference will be made to FIGURES 5–8 where the torque transmitting device, generally indicated at 110, comprises an input rotary member 112 of generally disc-shaped configuration having a central axis of rotation, indicated by the numeral 114; an output rotary member 116, also of generally disc-shaped configuration having a central axis of rotation, indicated by the numeral 118; and torque transmitting means between the rotary members permitting relative movement therebetween during rotation in a direction transverse to the axes of rotation of 114 and 118 thereof.

As shown in FIGURES 5 through 8, the torque transmitting means of the device 110 includes a first set of at least three substantially identical link members 120, having one of the ends thereof rotatably connected with the rotary member 112 about axes spaced equally within a right cylindrical plane 122 concentric with the axis of rotation 114 of the rotary member 12. As best shown in FIGURE 7, each rotary connection is made up of a stub shaft member 124 fixedly secured within a suitable opening formed in the rotary member 112 and having its outer end portion engaged within a bearing 126 fixed within the adjacent end of the associated link member 120.

Disposed adjacent the link members 120 is an intermediate rotary member 128 of generally ring-like configuration having a central axis of rotation indicated by the numeral 130. The opposite ends of the link members 120 are rotatably connected with the intermediate rotary member 128 about axes spaced equally within a right cylindrical plane 132 concentric with the axis 130 and having a diameter equal to the diameter of the right cylindrical plane 122. As before, each rotary connection is made up of a stub shaft element 134 suitably fixed within the rotary member 128 and having an end portion 136 extending outwardly from one side thereof journaled within a bearing 138 fixed to the adjacent opposite end of the associated link member 120.

A second set of at least three link members 140 of identical construction substantially the same as the link members 120 is provided between the intermediate rotary member 128 and the output rotary member 116. One of the ends of the link members 140 is rotatably connected with the intermediate rotary member 128, as by stub shaft portions 142 extending outwardly from the stub shaft elements 134 in a direction opposite from the portions 136 and bearings 144 suitably fixed to the link members. Consequently, the pivotal axes provided by the stub shaft portions 142 and bearings 144 are disposed in equally spaced relation within the right cylindrical plane 132.

The opposite ends of the link members 140 are pivotally connected with the output rotary member 116 about axes spaced equally within a right cylindrical plane 146 concentric with the axis 118 and of a diameter equal to the diameter of the right cylindrical plane 132. As before, the rotatable connection is made by a stub shaft element 148 fixed within the rotary member 116 extending outwardly therefrom and journaled within bearings 150 suitably fixed in the opposite ends of the link members 140.

It will be understood that the rotary members 112 and 116 may be suitably connected in any torque transmitting system. The torque transmitting device 110 has particular utility in systems where the input and output rotary members are movable transversely with respect to each other during rotation and more particularly where such transverse movement is generally rectilinear. An important functional characteristic of the present torque transmitting device is that this relative transverse movement has no effect upon the angular velocity of rotation of the rotary members. The relative transverse movement is provided because the sets of link members form effectively two arms of a toggle linkage. Each set of link members provides for a relative circular orbital translational movement of each of the rotary members connected thereto about the rotational axes of the other. Thus, the axis of each rotary member is in effect the pivotal axis of an arm of a toggle linkage, the axis of the intermediate rotary member constituting the common axis of the toggle linkage. The distance between the axes of adjacent rotary members is equal to the distance between the axes of the links. Where the distance between the axes of the link members of one set is equal to the distance between the axes of the link members of the other set, as shown in FIGURES 5 through 8, the total relative transverse movement provided between the input axis and the output axis is defined by an area of a circle having a radius equal to twice the distance between the axes of any one link member. Stated differently, if the axis of the input rotary member is held stationary, the axis of the output rotary member can be moved into any point within that circle since the latter is capable of movement in a circle about an axis which, in turn, is capable of moving in a circle the radii of which are equal. Moreover, it will be seen that since the orbital movement of an intermediate rotary member about the input rotary member is translational and the orbital movement of the output rotary member about the intermediate rotary member is translational, any transverse movement of the output rotary member with respect to the input rotary member will likewise be translational. Consequently, the angular relationship of the rotary members remains the same and is unaffected by any relative translational movement so that if a constant angular velocity of rotation is imparted to the input rotary member, the intermediate and output rotary members will have a constant angular rotary movement and such constant angular rotary movement will not be changed when the axis of the output rotary member is moved transversely with respect to the axis of the input rotary member.

Where the torque transmitting coupler 110 is intended to deform or break upon receiving severe impacts along the longitudinal axis of the steering column 10, it is preferred that the link members 120 and 140, disposed between the rotary members 112, 128 and 116, provide the means for deforming or breaking the coupling. The link members 120 and 140 can be constructed of a material and of such dimensions that deforming will be limited to take place only when severe impacts are received along the steering column 10, and for all normal steering uses, the entire torque transmitting coupler will remain intact and entirely functional.

Having described a preferred embodiment of this invention, it can be seen that the steering column construction provides for an adjustment of the steering wheel 16 relative to the position of the driver; greater safety is provided due to the offset construction which interrupts impact forces running along the length of the column; and there is a better transmission of rotative steering movements as a result of the particular type of coupler 110 used in the steering column. In addition, a more efficient use of front compartment space in an automobile can be accomplished through a selective positioning of offset segments of the steering column, and the lowermost segment of the steering column can move relative to the remainder of the column as the front end steering structure of the automobile, to which the column is attached, moves in response to road and steering conditions.

Variations in the preferred form of this invention will become obvious to those skilled in the art, and such variations are intended to be included within the scope of this invention.

What is claimed:

1. A steering column for transmitting steering movements to a vehicle comprising:
    a steering wheel means for receiving steering and control movements from a driver of said vehicle,
    a first steering shaft rigidly connected to said steering wheel means for transmitting rotary movements imparted to the steering wheel means,
    a second steering shaft offset from said first steering shaft for relaying rotary steering and control movements to steering linkages which effect steering and control movements of said vehicle, said second steering shaft being connected by intermediate means to said steering linkages so as to translate rotary movements of the steering column into steering movements for said vehicle, and
    torque transmitting means operatively connected between said first steering shaft and said second steering shaft for transmitting rotational movements from said first shaft to said second shaft, whereby steering movements imparted to said steering wheel will be transmitted and translated into steering and control movement for said vehicle, said torque transmitting means having: a first rotary member drivingly connected with an end of said first steering shaft for rotation therewith about a first axis of rotation, a second rotary member drivingly connected with an end of said second steering shaft and having a second axis of rotation offset relative to the first axis of rotation of said first rotary member, and means operatively connected between said first and second rotary members and having a substantially constant resultant centrifugal force substantially equal to zero during operation and a substantially constant resultant torque transmitting force substantially equal to zero with respect to said first and second axes of rotation during operation for transmitting rotational movement of said first rotary member about said first axis to said second rotary member about said second axis, wherein said means operatively connected between said first and second rotary members further comprises:

an intermediate rotary member disposed between said first and second rotary members and having a third axis of rotation parallel with said first and second axes of rotation, a first series of at least three link members of substantially identical construction disposed in parallel relation with respect to each other and having their ends rotatably connected respectively with said first rotary member and said intermediate rotary member about axes spaced equally within right cylindrical planes of equal diameter respectively concentric with said first axis and said third axis, and a second series of link members of substantially identical construction disposed in parallel relation with respect to each other and having their ends rotatably connected respectively with said intermediate rotary member and said second rotary member about axes spaced equally within right cylindrical planes of equal diameter respectively concentric with said third axis and said second axis.

2. The steering column of claim 1 wherein said torque transmitting means is deformable upon receiving a severe impact along the longitudinal axis of said column, whereby said steering column will collapse at the point of connection between said first and second steering shafts.

3. The steering column of claim 1 wherein said first and second steering shafts are adjustable relative to one another through said torque transmitting means, whereby the position of said steering wheel may be adjusted relative to the position of the driver of said vehicle.

4. An adjustable steering column for transmitting steering movements to a vehicle comprising:

a steering wheel means for receiving steering and control movements from a driver of said vehicle, steering linkage means for receiving steering motions from said steering wheel means and for translating said motions into steering and control movements of said vehicle, at least one torque transmitting means operatively connected between said steering wheel means and said steering linkage means, said torque transmitting means including displaceable coupling members, said torque transmitting means having: a first rotary member drivingly connected with an end of said first steering shaft for rotation therewith about a first axis of rotation, a second rotary member drivingly connected with an end of said second steering shaft and having a second axis of rotation offset relative to the first axis of rotation of said first rotary member, and means operatively connected between said first and second rotary members and having a substantially constant resultant centrifugal force substantially equal to zero during operation and a substantially constant resultant torque transmitting force substantially equal to zero with respect to said first and second axes of rotation during operation for transmitting rotational movement of said first rotary member about said first axis to said second rotary member about said second axis, wherein said means operatively connected between said first and second rotary members further comprises:

an intermediate rotary member disposed between said first and second rotary members and having a third axis of rotation parallel with said first and second axes of rotation, a first series of at least three link members of substantially identical construction disposed in parallel relation with respect to each other and having their ends rotatably connected respectively with said first rotary member and said intermediate rotary member about axes spaced equally within right cylindrical planes of equal diameter respectively concentric with said first axis and said third axis, and a second series of link members of substantially identical construction disposed in parallel relation with respect to each other and having their ends rotatably connected respectively with said intermediate rotary member and said second rotary member about axes spaced equally within right cylindrical planes of equal diameter respectively concentric with said third axis and said second axis, and adjustment means for displacing said steering wheel into various positions as determined by the range of movement of said displaceable coupling members included in said torque transmitting means.

5. The adjustable steering column of claim 4 wherein said link members of said torque transmitting means are deformable upon receiving a severe impact along the longitudinal axis of said steering column, whereby said steering column will collapse upon such impact.

References Cited by the Examiner

UNITED STATES PATENTS

| | | | |
|---|---|---|---|
| 2,114,663 | 4/1938 | Erickson | 74—493 |
| 2,852,956 | 9/1958 | May | 74—493 |
| 2,865,222 | 12/1958 | Bachman | 74—493 |
| 2,895,345 | 7/1959 | McLure | 74—493 |
| 2,910,887 | 11/1959 | Helms | 74—493 |

FOREIGN PATENTS 788,103   7/1935   France.

MILTON KAUFMAN, *Primary Examiner.*

BROUGHTON G. DURHAM, *Examiner.*

H. C. COE, *Assistant Examiner.*